Patented Aug. 10, 1937

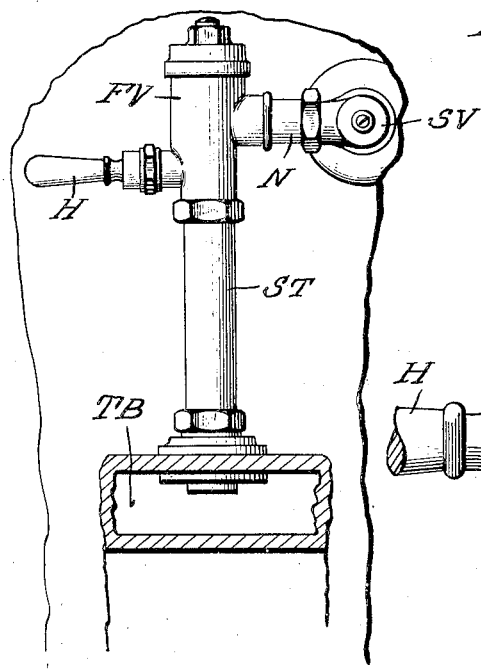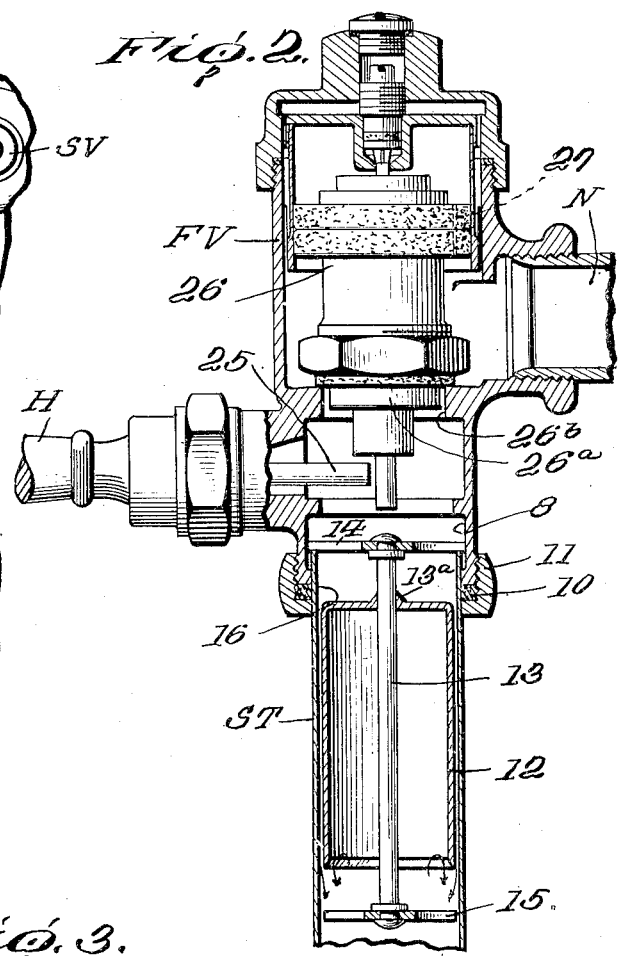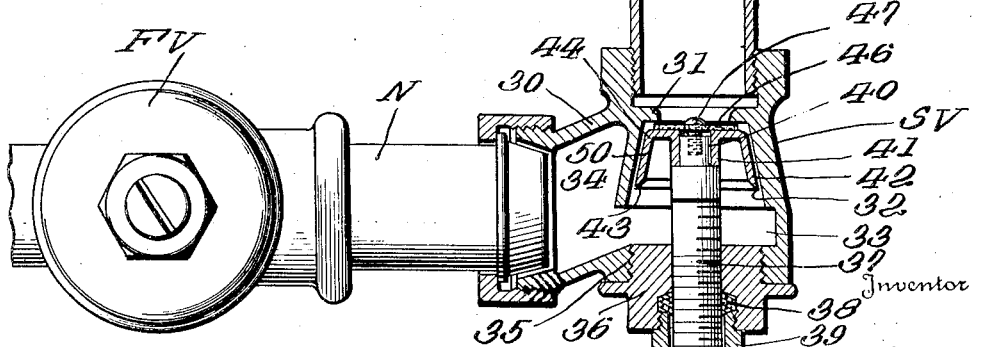

2,089,223

UNITED STATES PATENT OFFICE 2,089,223

QUIET FLOW CONTROLLING APPARATUS

Walker F. Peterson and Albert U. Walter, Baltimore, Md., assignors to Baltimore Valve Corporation, Baltimore, Md., a corporation of Maryland Application February 10, 1936, Serial No. 63,258

13 Claims. (Cl. 138—40)

This invention relates to means for throttling or retarding the flow of liquids with a minimum of noise in the apparatus as a whole.

In our copending application Serial No. 737,842, filed July 31, 1934, we have described a device operating for this purpose, and illustrated as comprising a specific form of structure.

In lieu of using slowly-filled and quickly-discharged flushing tanks for toilets and like devices, it has also been the practice to employ automatically-closed valves which in one operation discharge quickly a metered quantity of water, and then close again. These devices are noisy at high water supply pressures, and the rate of flow during the period of maximum flow cannot be controlled by the automatic valves themselves. It is a common practice to install an automatic flushing valve in connection with a regulating stop valve which performs the function of shutting off the supply for permitting repairs to the automatic valve, and also the function of regulating the flow of water so as to secure the best functioning without the supply of water at too great or too small a rate. These regulating valves are usually made with extra large passageways; and hence when the valves are wide open, very little noise occurs in the regulating valve; but with higher water supply pressures, this leads to excessive flow of water through the apparatus with consequent waste, excessive turbulence, and disagreeable splashing and other noises at the automatic valve and at the discharge point. On the other hand, when the regulating valve is partially closed, the noise caused in this valve is even greater than the noises developed in the supply line and the automatic valves.

An object of the present invention is to provide means for retarding or regulating the flow of liquid, which occupies only a comparatively restricted space for an optimum volume-rate of flow therethrough.

A further object of the invention is to provide such means with devices for regulating the retardation effect upon the water.

With these and other objects in view, as will appear in the course of the following specification and claims, illustrative forms of practicing the invention are shown on the accompanying drawing, in which:

Figure 1 shows a conventional assembly of an automatic flushing valve installation in conjunction with a toilet.

Figure 2 is an upright sectional view through a conventionally illustrated automatic flushing valve and through the supply means connecting this valve with the toilet, and including a retarding device according to the present invention.

Figure 3 is a sectional view of a regulating stop valve which has been modified to present an embodiment of the present invention.

It has been found, as set out in our copending application, that the shape of the cross-section of flow and of discharge has a most important influence upon the amount of noise, or upon the critical velocity at which noise occurs; and that the thinner or narrower the cross-section, the quieter the flow or the higher the critical velocity at which noise occurs. In the copending application, a thin sheet of water was obtained by simply deforming the discharge section of a flow tube so that opposed walls were presented at a distance from one another which permitted the flow of water under retardation by the proximity of these walls to each and every filament of the flowing stream. In the particular illustrated form of the copending application, an increase of quantity of flow can be obtained by increasing the original diameter of the tube. This, however, gives rise to difficulties where the volume-rate of flow must be large, as in automatic flushing valves, in distinction from the ball cock used in more slowly filling and flushing tanks; and, therefore, the use of the illustrated form of the copending application in some instances would lead to a bulky, cumbersome and impractical structure.

The present invention utilizes the sheet-like flow but secures a large volume of flow with practical retardation and quieting in a small space. Fundamentally, the present invention differs from the illustrated form in the prior application in providing for this flow in the form of an "annular sheet" rather than in a flat sheet.

In Fig. 1 is illustrated a conventional way of employing an automatically-closing flushing valve for a toilet. The valve SV is connected to the water supply line (not shown) for receiving water therefrom and delivering it through a nipple N to the flushing valve FV. When the handle H of the flushing valve FV is operated, a metered quantity of water is discharged through the supply tube ST to the toilet bowl TB of which a portion is shown as providing a passage through which this water moves in the usual way for flushing the bowl. In such a conventional assembly, regardless of whether the tube is connected to the top, back or side of the bowl fixture, it has a straight portion for a distance of several inches.

As shown in Fig. 2, this straight portion of the tube ST may be provided, according to the present invention, with a structure for throttling or retarding the flow therein, in order to obtain a flushing operation with a minimum of noise. In the illustrated form, the tube ST is joined to the lower end of the valve FV by telescoping into a socket provided by boring a recess 8 therein. A water-tight joint at this point is obtained by using a flexible packing 10 with a coupling nut 11 which is threaded onto the outside of the lower end of the valve FV in the usual way. In usual practice, the supply tube ST is of brass tubing having an outside diameter of about 1½ inches and an inside diameter of about 1⅜ inches.

A cylinder 12 is inserted concentrically within the supply tube ST and is of an external diameter less than the internal diameter of the tube ST to provide an annular passage for the water on its way from the valve FV to the toilet bowl TB. It is preferred to form this cylinder hollow with its upper end closed, in order to save weight and material. It is fixed to a rod 13 as by a brazed or soldered connection 13a. This rod is attached at its upper end to a spider 14 which has its periphery of greater diameter than the inside diameter of the supply tube ST so that it is supported on the upper end of this tube. The lower end of the rod 13 is connected to a smaller spider 15 which has an external diameter substantially equal to the internal diameter of the supply tube ST and which is located substantially below the lower end of the cylinder. The two spiders cooperate in maintaining the cylinder 12 in its concentric position.

The upper end of the cylinder preferably has a rounded section 16 to prevent vena contracta effects as the water passes into the annular space. The lower end of the cylinder 12 is formed to provide a sharp edge at the outer surface, the inner wall of the cylinder 12 being beveled for this purpose, in order to permit water already present below the cylinder to meet the water passing downward in the annular space 20 at a low angle, as indicated by the arrows in Fig. 2.

The tube ST and the cylinder 12 are each of substantially uniform diameters, and are mounted concentrically with respect to one another so that the annular space 20 is of uniform thickness. Thus, so to speak, an "annular sheet" of water is permitted to pass while the flushing valve FV is open. The axial length of this annular passageway is determined by the length of the cylinder 12, its thickness by the difference in the external diameter of the cylinder 12 and the internal diameter of the tube ST, and its peripheral length by the size of the supply tube ST. The cross-sectional area of the annular passageway (that is, the product of the thickness of the sheet times its peripheral length) is always less than the cross-sectional area of the main water supply line and less than the minimum passageway through the valves SV and FV when these are wide open, in order that the minimum cross-section of flow shall then be that provided in this annular passageway.

It is preferred to have the thickness of this annular sheet between 0.020 and 0.060 inch, dependent upon the water pressure supplied to the apparatus; the higher the pressure, the less the thickness.

The axial length of the annular sheet of water, and thus of the cylinder 12, should always be at least ten times the thickness of the annular sheet, and as much longer than this minimum as feasible. In a typical installation, the cylinder 12 is from two to four inches long.

In operation, when the handle H is operated, the stem 25 raises the body 26 of the valve from its seat, so that water may flow from the nipple N, past the valve 26 and through the spider 14, and thence downward through the annular passageway formed by the cylinder 12 and the supply tube ST. As the cross-sectional area of the annular passageway is less than that of other parts of the line and the valves SV and FV, the effect is to retard the rate of flow in the system as a whole; and this retardation is accomplished quietly within the annular passageway itself and without noise in or at the discharge therefrom, and therewith the velocity through the rest of the system is reduced below the critical velocity at which noise occurs; and the back pressures to the valves FV and SV reduce the pressure differentials thereat so that the system as a whole operates without objectionable noise.

During the cycle of operation of the flushing valve FV, the metering passage 27 also receives water, and the valve body 26 is gradually lowered until it shuts off the flow in the usual way. During the lowering of the valve body, the reduced lower end 26a enters a passage 26b which is only slightly larger in size; and thus a reduced flow is produced for a period of several seconds prior to the final closure of the valve body 26 upon its seat, for permitting the discharge of water from the toilet bowl, for instance, by siphon action, with a breaking of the siphon; and thereafter permitting the reduced flow to continue for resealing the trap and providing a full water surface in the bowl. At this time the point of maximum constriction will normally occur between the members 26a and 26b, but the presence of the cylinder 12 in the supply tube ST serves to maintain a body of water between the valve body 26 and the cylinder 12, so that the water passing between the portions 26a and 26b is discharged into a larger body of water, under a slight additional back pressure created by the retardation of the annular sheet.

During the cycle of operation of the flushing valve FV, the metering passage 27 also receives water, and the valve body 26 is gradually lowered until it shuts off the flow in the usual way. At the time of shut-off, the usual noises are quieted by the action of the cylinder 12, as its surfaces and those of the supply tube ST have maintained a body of water between the cylinder 12 and the valve body 26 for receiving the water passing the valve body 26 during the shut-off period, and thus reducing the usual shut-off noises.

In a specific instance, with a water supply pressure of 95 pounds which is maintained during the full flushing period at the inlet to the flushing valve FV, it was found that a cylinder 12 having an axial length of 4 inches and being of such external diameter as to provide a thickness in the annular sheet of 0.025 inch gave a sufficient volume of flow for the proper flushing of the toilet, and at the same time eliminated substantially the objectionable noises during the full flushing, the refill and the shut-off periods of the valve FV.

In another instance, with a thickness of 0.030 inch in the annular sheet and a supply pressure of 60 pounds, similar quietness was obtained in the system. Upon increasing the supply pressure to 95 pounds, and adjusting the usual stop valve SV to determine a proper rate of flow into the bowl, quietness was likewise obtained in the entire system.

The cylinder 12 need not be accurately positioned and rigidly supported by the spiders 14 and 15, as looseness can be tolerated. With such looseness, the water flowing in the annular sheet operates to effect a displacement of the cylinder 12 and center it in the supply tube ST, if it is incorrectly centered originally.

While in the form shown in Fig. 2 the quieting device has been located downstreamward of the final valve (that is, between the flushing valve FV and the toilet bowl TB), it is likewise feasible to provide the quieting device between the supply line and the final valve.

Such an arrangement is shown in Fig. 3, in which the quieting device is incorporated in the valve SV. In this structure, the water supply connection WS leads into the body 30 of the valve which is illustrated as having an internal flange 31 providing at one surface a seat and having its other edge rounded. Beyond this flange is a conical passage 32 leading to the chamber 33 which is in communication with the outlet chamber 34 formed within the connection for the nipple N. In alignment with the conical portion 32, the valve is provided with an aperture having threads 35 for receiving a threaded cover 36 having an aperture therethrough, the lower portion of which is threaded to receive and support the threaded stem 37. A packing 38 and nut 39 seal the stem against leakage. The stem 37 has a reduced diameter 40 which is a forced fit into the boss 41 of a regulating plug 42 which is illustrated as having a conical shape corresponding to the shape of the conical passage 32, and having its larger free end provided with a sharp edge 43 corresponding to the sharp edge 17 in the form shown in Fig. 2; and having its closed smaller end provided with rounded corners 44 corresponding to the rounded corners 16 in the form shown in Fig. 2. The smaller end of the body 42 is provided with a fiber or like washer 46 for closing against the seat 31, which is held in position by a screw 47. Thus the device may also be employed as a shut-off valve.

The parts are, however, so constructed and arranged that when the valve is being used as a regulating valve, the restriction at the annular passageway is greater than that at the seat and the seat washer, so that the point of maximum restriction is always at the annular passage, which quietly retards the flow, rather than at the valve seat where the retardation of the flow causes noise. The plug 42 and the conical passage 32 are so proportioned that there is always an annular conical space 50 therebetween, even when the valve is seated and closed.

The angularities of the conical passage 32 and of the plug 42 are important. It is preferred to have the same apex angle for the conical passage and the plug (that is, the angle subtended between two generatrices located in the same diametrical plane), so as to provide a conical annular passageway therebetween of uniform width throughout its length. It is also preferred to have such apex angle less than 30 degrees. When, however, an apex angle in one of these members of more than 30 degrees is utilized, it is preferable to have the apex angle of the plug or inside member slightly greater than that of the conical passageway or outside member. In this way it is possible to avoid an excessive and undesirable increase in cross-sectional area of the annular passageway from inlet to outlet. In valves for the purpose herein described, it has been found that an increase in such area of over 33 per cent, with an annular sheet of uniform thickness delimited by a plug ⅝ inch long, for example, leads to the production of noise in the device itself. It is to be noted that for a given apex angle and for a given axial length of conical annular passageway, the increase of area between the inlet and outlet ends expressed in percentage varies with the actual diameter of the passageway at any given point. Therefore as the axial diameter of the conical annular passageway is decreased, it is necessary to reduce the apex angle thereof in order to avoid any excess percentage increase in area. It has also been found that when the apex angle of the plug or inside member is less than that of the conical passageway or outside member, there is a tendency to noise even at relatively low velocities and that the apex angle of the plug should never be more than 4 degrees smaller than the apex angle of the conical passageway.

The thickness of the annular sheet of water may be varied, in this type of construction, by rotating the stem 37 so that the conical plug 42 approaches or recedes from the seat 31. In adjusting the valve of Fig. 3, after it has been used for shutting off the supply, the stem 37 is rotated to withdraw the conical plug 42 and open the passage between the washer 46 and the seat 31. This rotation is continued, while operating the flushing valve, until a sufficient rate of flow is obtained to properly flush the bowl. Because a valve for this purpose must be made compactly, the maximum diameter and length of the annular passageway is limited. It has been found that when the axial length of the conical passage 32 is of the order of ⅞ of an inch, the axial length of the conical plug 42 is of the length of ⅝ of an inch, the apex angle is 22 degrees, and the large diameter of the plug is 1⅜ of an inch, very satisfactory results are obtained in a device for flushing the normal toilet bowl with city pressure ranging from 30 to 100 pounds. Under a water pressure of 95 pounds, quietness and the desired rate of flow were obtained when the parts were adjusted to give an annular sheet of water having a thickness of 0.020 inch.

As set out above, the thickness of the annular sheet should not be over 0.125 inch, and its length in the direction of flow at least ten times its thickness.

It is obvious that the invention is not limited to the illustrated embodiments, but may be modified in many ways within the scope of the appended claims.

We claim:

1. A quiet flow retarding device for liquids comprising means providing a conduit, and a body located in said conduit and supported against axial movement relative thereto, the internal wall of the conduit and the adjacent wall of the body providing an annular space which remains constantly open for the flow of liquid which causes the liquid during the operation of the device and to flow in a sheet having a substantially uniform thickness of less than 0.125 inch for a length in the direction of flow of more than ten times the thickness of the sheet.

2. A quiet flow retarding device for liquids, comprising a cylindrical outer conduit, and a body located in and spaced from said conduit, the internal wall of the conduit and the adjacent wall of the body being concentric and cylindrical for a distance of not less than 2 inches and being separated by a distance not exceeding 0.125 inch.

3. A quiet flow retarding device for liquids, comprising a conduit downstreamward of a closing valve, and a body located in said conduit, the internal wall of the conduit and the adjacent wall of the body providing an annular space for the flow of liquid, the walls being substantially uniformly spaced a distance of not more than 0.125 inch for a distance in the axial direction at least ten times the said spacing distance.

4. A quiet flow retarding device for liquids, comprising a cylindrical outer conduit, a cylindrical member located in and spaced from said conduit, supporting means projecting axially at one end of the member, and means connected to the supporting means and extending to the conduit walls for maintaining the member in position.

5. A quiet flow retarding device for liquids, comprising means providing a conduit, a body located in and spaced from the conduit, said conduit and body having concentric conical forms with substantially the same apex angles for providing an annular passage space, and means for relatively moving the body and conduit axially for varying the spacing therebetween, the said space having a length in the direction of flow of at least one half inch and a thickness of less than 0.060 inch.

6. A quiet flow retarding device for liquids, comprising means providing a conduit, a body located in and spaced from the conduit, said conduit and body having concentric conical forms with substantially the same apex angles for providing an annular passage space, the body being shorter than the conical portion of the conduit so that they may be relatively moved axially while continuing to provide a passage space of constant length in the direction of flow, and means for relatively moving the body and conduit.

7. A quiet flow retarding device for liquids, comprising means providing a conduit, and a body located in and substantially uniformly spaced from the internal wall of the conduit, said body being hollow and having a closed upstreamward end and an open downstreamward end into which liquid may pass from a point downstreamward of the body, the edge at the downstreamward end being beveled internally.

8. A quiet flow retarding device for liquids, comprising means providing a conduit, and a body located in and spaced from the conduit, the body having rounded inlet edges at the upstream end and being substantially uniformly spaced for substantially the entire length of its wall away from the internal wall of the conduit by a distance of less than 0.125 inch.

9. A quiet flow retarding device for liquids, comprising means providing a conduit, and a body located in and spaced from the conduit, both conduit and body having conical adjacent walls so that the space therebetween is of substantially uniform thickness, the end of smaller diameter being upstreamward and the increase of cross-sectional areas of the annular space from the smaller to the larger end being not over 33 percent.

10. A quiet flow retarding device for liquids, comprising means providing a conduit, and a body located in and spaced from the conduit, both conduit and body having conical adjacent walls with an apex angle of substantially 22 degrees and being spaced substantially 0.020 to 0.040 inch and overlapping in the direction of flow a distance of at least ten times the spacing thereof.

11. A quiet flow retarding device for controlling the flow of water, comprising a conduit having an inlet and an outlet, a body located in said conduit between the inlet and the outlet and means for supporting the body against movement while liquid is flowing from the inlet toward the outlet, the internal wall of the conduit and the adjacent wall of the body providing an annular space for the flow of liquid, the walls being spaced a distance of .020 to .060 inch for a length of at least ten times said spacing distance, said conduit being straight and having a substantially uniform cross section opposite the body, the upstream end of said body being located downstreamward of the inlet end of the conduit so that water adjacent the walls of the conduit can pass into said annular space in an axial direction.

12. A quiet flow retarding device for liquids comprising means providing a conduit, and a body located in said conduit and supported against axial movement relative thereto, the internal wall of the conduit and the adjacent wall of the body providing an annular space which remains constantly open during the operation of the device for the flow of liquid and which causes the liquid to flow in a sheet having a thickness of less than 0.125 inch for a length in the direction of flow of more than ten times the thickness of the sheet.

13. A quiet flow retarding device for liquids, comprising a conduit extending downstreamward from a closing valve and having a straight portion of uniform cross section, a body located in said conduit in the portion thereof having the uniform cross section, and means for supporting the body against movement while liquid is flowing through said conduit from the closing valve, the internal wall of the conduit and adjacent wall of the body providing an annular space for the flow of liquid, the walls being spaced a distance of substantially 0.20 to 0.60 inch for a length of at least ten times said spacing distance, the upstreamward end of said body being located downstreamward of the inlet end of the conduit so that liquid adjacent the walls of the conduit can pass into said annular space in an axial direction, the said spacing distance at the downstream end of said body being no greater than the said spacing distance at the upstream end of said body.

WALKER F. PETERSON.
ALBERT U. WALTER.